US011834072B2

(12) United States Patent
Shimbo et al.

(10) Patent No.: US 11,834,072 B2
(45) Date of Patent: Dec. 5, 2023

(54) DRIVING ASSIST APPARATUS WITH AUTONOMOUS BRAKING CONTROL

(71) Applicant: TOYOTA JIDOSHA KABUSHIKI KAISHA, Toyota (JP)

(72) Inventors: Yuto Shimbo, Toyota (JP); Yuma Hoshikawa, Nagoya (JP); Toshifumi Kawasaki, Toyota (JP); Ryota Murakami, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 320 days.

(21) Appl. No.: 17/035,852

(22) Filed: Sep. 29, 2020

(65) Prior Publication Data
US 2021/0213974 A1 Jul. 15, 2021

(30) Foreign Application Priority Data
Jan. 9, 2020 (JP) .................. 2020-001798

(51) Int. Cl.
*B60W 60/00* (2020.01)
*B60W 10/18* (2012.01)
(Continued)

(52) U.S. Cl.
CPC ........ *B60W 60/0015* (2020.02); *B60W 10/06* (2013.01); *B60W 10/08* (2013.01);
(Continued)

(58) Field of Classification Search
CPC .. B60W 60/0015; B60W 10/06; B60W 10/08; B60W 10/18; B60W 30/09;
(Continued)

(56) References Cited

U.S. PATENT DOCUMENTS

2010/0023234 A1 1/2010 Kameyama
2014/0025267 A1* 1/2014 Tezuka ............ B60W 30/18027
701/51

(Continued)

FOREIGN PATENT DOCUMENTS

CN 103569114 A 2/2014
CN 104249724 A 12/2014
(Continued)

OTHER PUBLICATIONS

English Translation of JP2015000625A Author: Suzuki Tomokazu Title: Vehicular Control System Date: Jan. 5, 2015 (Year: 2015).*

(Continued)

*Primary Examiner* — James J Lee
*Assistant Examiner* — Steven Vu Nguyen
(74) *Attorney, Agent, or Firm* — Sughrue Mion, PLLC (57) ABSTRACT

A driving assist apparatus executes an autonomous braking control when a predetermined autonomous stop condition becomes satisfied, executes a stopped state keeping control to keep the own vehicle stopped after stopping the own vehicle by the autonomous braking control, and terminates executing the stopped state keeping control when a predetermined stopped state keeping termination condition becomes satisfied while executing the stopped state keeping control. The driving assist apparatus executes a driving force limitation control to limit a driving force generated to move the own vehicle to a value smaller than the driving force
(Continued)

which depends on an amount of operating the acceleration pedal when determining that the predetermined stopped state keeping termination condition is satisfied, and a mistaken pressing operation occurs. The mistaken pressing operation is an operation performed by a driver to mistakenly press an acceleration pedal with an intention to press a brake pedal.

8 Claims, 6 Drawing Sheets

(51) Int. Cl.
*B60W 30/09* (2012.01)
*B60W 50/10* (2012.01)
*B60W 40/08* (2012.01)
*B60W 10/08* (2006.01)
*G08G 1/16* (2006.01)
*B60W 10/06* (2006.01)

(52) U.S. Cl.
CPC ............ *B60W 10/18* (2013.01); *B60W 30/09* (2013.01); *B60W 40/08* (2013.01); *B60W 50/10* (2013.01); *G08G 1/16* (2013.01); *B60W 2540/10* (2013.01); *B60W 2540/12* (2013.01); *B60W 2554/00* (2020.02)

(58) Field of Classification Search
CPC .. B60W 40/08; B60W 50/10; B60W 2554/00; B60W 2540/10; B60W 2540/12; G08G 1/16
See application file for complete search history.

(56) References Cited

U.S. PATENT DOCUMENTS

| | | | |
|---|---|---|---|
| 2015/0001919 A1* | 1/2015 | Murayama | B60T 13/662 303/14 |
| 2017/0106839 A1* | 4/2017 | Uechi | B60T 7/042 |
| 2018/0043885 A1* | 2/2018 | Harada | B60W 10/06 |

FOREIGN PATENT DOCUMENTS

| | | |
|---|---|---|
| CN | 106985803 A | 7/2017 |
| JP | 2010-23769 A | 2/2010 |
| JP | 2013-129228 A | 7/2013 |
| JP | 2014-091349 A | 5/2014 |
| JP | 2016-13807 A | 1/2016 |
| JP | 2019-084984 A | 6/2019 |
| JP | 2019-143484 A | 8/2019 |

OTHER PUBLICATIONS

English Translation of JP2013129228A Author: Tokoro Setsuo Title: Vehicle Control Device Date: Jul. 4, 2013 (Year: 2013).*

* cited by examiner

DRIVING ASSIST APPARATUS WITH AUTONOMOUS BRAKING CONTROL

BACKGROUND

Field

The invention relates to a driving assist apparatus to stop an own vehicle by an autonomous braking and keep the own vehicle stopped.

Description of the Related Art

There is known a technique to forcibly stop an own vehicle by an autonomous braking. For example, there is known a collision avoidance assist apparatus to increase hydraulic pressure (i.e., brake hydraulic pressure) applied to a brake apparatus to activate the autonomous braking to stop the own vehicle when (i) an obstacle is detected by a front sensor such as a camera sensor and a radar sensor, and (ii) the own vehicle potentially collides with the detected obstacle. The known collision avoidance assist apparatus executes a stopped state keeping control to maintain the brake hydraulic pressure at a high pressure to keep the own vehicle stopped for a predetermined amount of time (for example, two seconds) after this known apparatus stops the own vehicle by the autonomous braking.

An assist apparatus disclosed in JP 2019-84984 A continues executing the stopped state keeping control when this apparatus (hereinafter, will be referred to as "the conventional apparatus") determines that the own vehicle is desirably kept stopped after a predetermined amount of time elapses since the own vehicle is stopped by the autonomous braking. Then, the conventional apparatus terminates executing the stopped state keeping control at a point of time when the conventional apparatus detects an operation performed by a driver of the own vehicle (for example, an acceleration pedal operation, a brake pedal operation, etc.). For example, when the own vehicle stops before an intersection or when the own vehicle stops due to detecting another vehicle moving in a direction crossing a direction of moving of the own vehicle, the own vehicle is determined to be desirably kept stopped after the predetermined amount of time elapses. Thereby, an execution of the stopped state keeping control is continued. Then, when the operation performed by the driver is detected, the execution of the stopped state keeping control is terminated. Thereby, keeping the own vehicle stopped, is terminated.

In this regard, the conventional apparatus is configured without considering a situation that a mistaken pressing operation occurs. The mistaken pressing operation is an operation mistakenly performed by the driver to press an acceleration pedal with an intention to press a brake pedal. A driver's operation of rapidly pressing the acceleration pedal may be presumably the mistaken pressing operation. For example, when the driver performs the mistaken pressing operation, the own vehicle rapidly approaches the obstacle, and an execution of the autonomous braking control may be started.

In this case, the driver may have become panicked. Thus, the driver may continue pressing the acceleration pedal strongly after the own vehicle is stopped by the autonomous braking control. The conventional apparatus executes the stopped state keeping control when the own vehicle is stopped by the autonomous braking control. Then, when the predetermined amount of time elapses or the driver's operation is detected after the execution of the stopped state keeping control is started, the conventional apparatus terminates executing the stopped state keeping control. At this time, if the driver mistakenly presses the acceleration pedal strongly, the own vehicle rapidly starts to move due to terminating the execution of the stopped state keeping control. In this case, the own vehicle rapidly approaches the obstacle which the own vehicle has once avoided colliding with, and the own vehicle may collide with the obstacle.

SUMMARY

The invention has been made for solving such problems. An object of the invention is to provide a driving assist apparatus which can prevent rapid moving of the own vehicle due to the mistaken pressing operation performed by the driver when the execution of the stopped state keeping control is terminated.

A driving assist apparatus according to the invention comprises an electronic control unit. The electronic control unit is configured to execute an autonomous braking control to apply a braking force to an own vehicle to autonomously stop the own vehicle when the electronic control unit determines that a predetermined autonomous stop condition becomes satisfied. Further, the electronic control unit is configured to execute a stopped state keeping control to keep the own vehicle stopped after the electronic control unit stops the own vehicle by the autonomous braking control. Furthermore, the electronic control unit is configured to terminate executing the stopped state keeping control when the electronic control unit determines that a predetermined stopped state keeping termination condition becomes satisfied while the electronic control unit executes the stopped state keeping control.

The electronic control unit is configured to determine whether a mistaken pressing operation occurs. The mistaken pressing operation is an operation performed by a driver of the own vehicle to mistakenly press an acceleration pedal of the own vehicle with an intention to press a brake pedal of the own vehicle. Further, the electronic control unit is configured to execute a driving force limitation control to limit a driving force generated to move the own vehicle to a value smaller than the driving force which depends on an amount of operating the acceleration pedal when the electronic control unit determines that (i) the predetermined stopped state keeping termination condition is satisfied, and (ii) the mistaken pressing operation occurs.

The driving assist apparatus according to the invention comprises the electronic control unit. The electronic control unit executes the autonomous braking control to apply the braking force to the own vehicle to autonomously stop the own vehicle when the electronic control unit determines that the predetermined autonomous stop condition becomes satisfied. For example, when the electronic control unit detects an obstacle which the own vehicle may collide with, the electronic control unit executes a braking control to control an activation of a brake apparatus to generate the braking force, thereby to stop the own vehicle without the driver operating the brake pedal.

The electronic control unit executes the stopped state keeping control to apply the driving force to the own vehicle to prevent forward and rearward moving of the own vehicle which has been once stopped by the autonomous brake control, thereby to keep the own vehicle stopped. Thereby, the own vehicle is kept stopped. Then, the electronic control unit terminates executing the stopped state keeping control, thereby to terminate keeping the own vehicle stopped when the predetermined stopped state keeping termination condition becomes satisfied while the electronic control unit is executing the stopped state keeping control.

When keeping the own vehicle stopped is terminated, and the driver mistakenly presses the acceleration pedal, the own vehicle rapidly starts to move due to terminating keeping the own vehicle stopped. In order to prevent rapid moving of the own vehicle, the electronic control unit determines whether the mistaken pressing operation that the driver mistakenly presses the acceleration pedal with an intention to press the brake pedal, occurs. For example, the electronic control unit determines whether a mistaken pressing determination condition is satisfied. The mistaken pressing determination condition is satisfied when the mistaken pressing operation is presumably performed. For example, an operation of rapidly pressing the acceleration pedal may be the mistaken pressing operation. Therefore, for example, the electronic control unit uses an amount of pressing the acceleration pedal and a rate of pressing the acceleration pedal to determine whether the mistaken pressing operation occurs.

When the electronic control unit determines that the predetermined stopped state keeping termination condition is satisfied, and the mistaken pressing operation occurs, the electronic control unit executes the driving force limitation control to limit the driving force generated to move the own vehicle to the value smaller than the driving force which depends on the amount of operating the acceleration pedal.

Thereby, the driving force generated to move the own vehicle is limited to the value smaller than the driving force which depends on the amount of operating the acceleration pedal even when the stopped state keeping termination condition becomes satisfied while the driver mistakenly presses the acceleration pedal contrary to the driver's intention. Thus, the rapid moving of the own vehicle can be prevented.

According to an aspect of the invention, the electronic control unit may be configured to execute the driving force limitation control when the electronic control unit determines that (i) the predetermined stopped state keeping termination condition is satisfied, (ii) the mistaken pressing operation occurs, and (iii) the amount of pressing the acceleration pedal is larger than or equal to a predetermined threshold.

According to this aspect of the invention, as a condition which the electronic control unit uses to determine whether to execute the driving force limitation control, a condition that the amount of operating the acceleration pedal is larger than or equal to the predetermined threshold, is provided in addition to a condition that the mistaken pressing operation occurs. The predetermined threshold may be a threshold capable of determining whether the acceleration pedal is deeply pressed. Therefore, according to this aspect, the driving force limitation control can be executed, further properly recognizing an operated state of the acceleration pedal performed by the driver.

According to another aspect of the invention, the electronic control unit may be configured to terminate executing the driving force limitation control when an amount of operating the acceleration pedal becomes equal to or smaller than a predetermined termination threshold while the electronic control unit executes the driving force limitation control.

According to further another aspect of the invention, the electronic control unit may be configured to terminate executing the driving force limitation control when the brake pedal is operated while the electronic control unit executes the driving force limitation control.

According to further another aspect of the invention, the predetermined autonomous stop condition may be a condition that a level of potential that the own vehicle collides with an obstacle, is larger than a predetermined level.

According to further another aspect of the invention, the electronic control unit may be configured to terminate executing the driving force limitation control when the obstacle is not detected while the electronic control unit executes the driving force limitation control.

According to further another aspect of the invention, the electronic control unit may be configured to determine that the mistaken pressing operation does not occur when an operation amount of the acceleration pedal becomes equal to or smaller than a predetermined determination threshold after the electronic control unit determines that the mistaken pressing operation occurs.

According to further another aspect of the invention, the driving force may be generated by one or more of an internal combustion engine and an electric motor.

Elements of the invention are not limited to elements of embodiments and modified examples of the invention described along with the drawings. The other objects, features and accompanied advantages of the invention can be easily understood from the embodiments and the modified examples of the invention.

DESCRIPTION OF THE EMBODIMENTS

Below, a driving assist apparatus according to an embodiment of the invention will be described with reference to the drawings.

Figure 1:
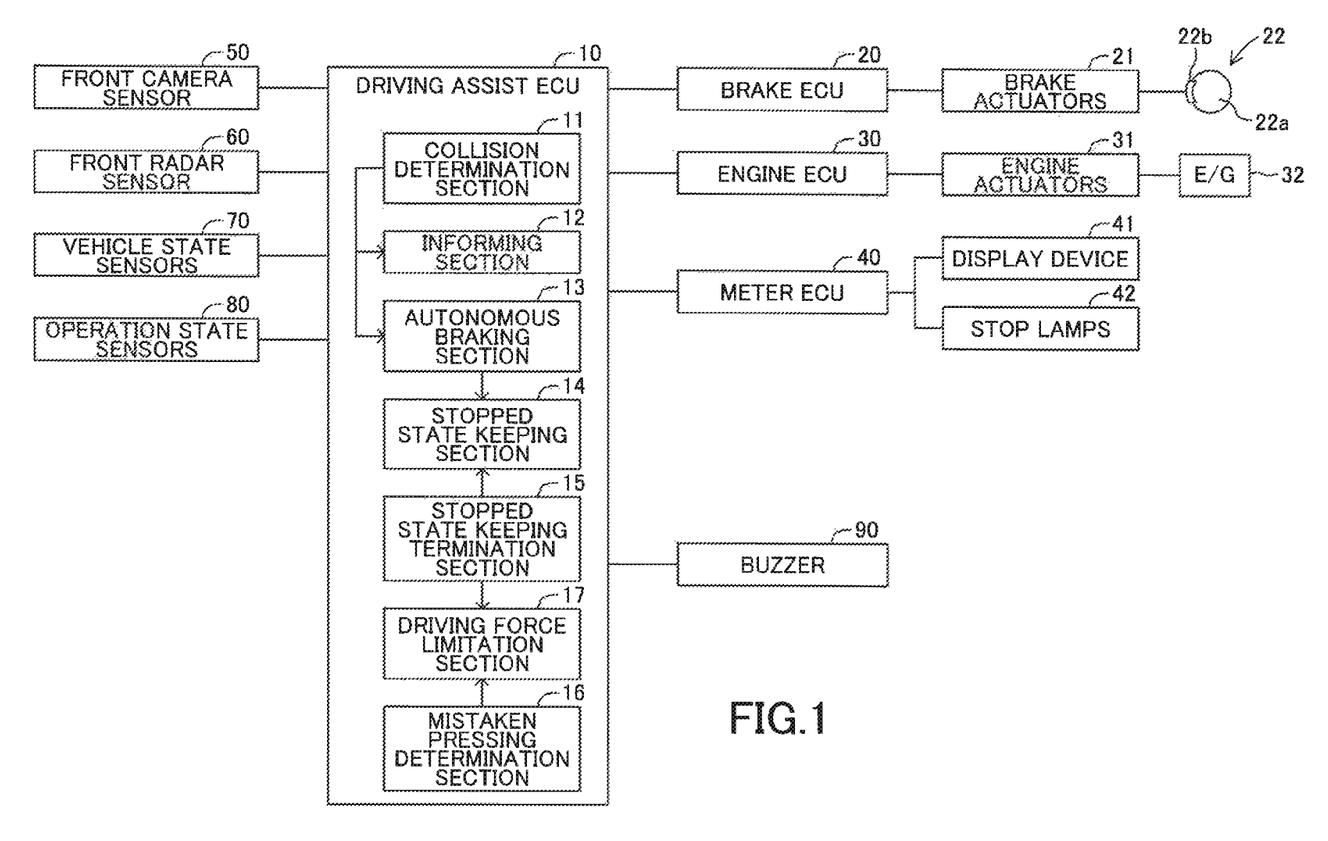
FIG. 1 is a view which shows a driving assist apparatus according to an embodiment of the invention.

The driving assist apparatus according to the embodiment of the invention is installed in a vehicle. Hereinafter, the vehicle installed with the driving assist apparatus according to the embodiment of the invention will be referred to as "the own vehicle" in order to distinguish the own vehicle from other vehicles. As shown in FIG. 1, the driving assist apparatus according to the embodiment of the invention includes a driving assist ECU 10, a brake ECU 20, an engine ECU 30, and a meter ECU 40.

The ECU's 10, 20, 30, and 40 are electronic control units. Each of them includes a micro-computer as a main component. The ECU's 10, 20, 30, and 40 are connected to each other via a CAN (Controller Area Network). Each of the ECU's 10, 20, 30, and 40 can send and receive data to and from the remaining of the ECU's 10, 20, 30, and 40. In this embodiment, the micro-computer includes a CPU, a ROM, a RAM, a non-volatile memory, and an interface I/F. The CPU realizes various functions by executing instructions, programs, and routines memorized in the ROM. Some or all of the ECU's 10, 20, 30, and 40 may be integrated in one ECU.

The driving assist ECU 10 is a main control unit which provides a driver driving assist to a driver of the own vehicle. The collision avoidance assist control is a control to (i) warn the driver when an obstacle is detected ahead of the own vehicle and (ii) avoid the vehicle from colliding with the obstacle by an autonomous braking when a level of potential that the vehicle collides with the obstacle is larger. The collision avoidance assist control is generally referred to as "the PCS control" or "pre-crash safety control." Hereinafter, the collision avoidance assist control will be referred to as "the PCS control".

The driving assist ECU 10 is electrically connected to a front camera sensor 50, a front radar sensor 60, vehicle state sensors 70, operation state sensors 80, and a buzzer 90.

The front camera sensor 50 is provided at an upper portion of a front windshield in an interior of the own vehicle. The front camera sensor 50 takes images of a view ahead of the own vehicle. The front camera sensor 50 realizes (i) white lane markings on a road and (ii) standing objects ahead of the own vehicle, based on the taken images. The front camera sensor 50 provides (i) information on the white lane markings as white lane marking information and (ii) information on the standing objects as standing object information to the driving assist ECU 10 with a predetermined cycle. The white lane marking information is information on (i) shapes of the white lane markings and (ii) relationships in position between the own vehicle and the white lane markings. The standing object information is information on (i) kinds and sizes of the standing objects detected ahead of the own vehicle and (ii) relationships in position between the own vehicle and the standing objects. The kinds of the standing objects may be recognized by machine learning such as pattern matching.

The front radar sensor 60 is provided on a front center portion of a body of the own vehicle. The front radar sensor 60 detects the standing objects ahead of the own vehicle. The front radar sensor 60 radiates radio waves of millimeter waveband. Hereinafter, the radio wave of the millimeter waveband will be referred to as "the millimeter waves." The front radar sensor 60 receives the millimeter waves reflected by the standing objects such as other vehicles, walking persons, bicycles, and buildings within a radiation area. The front radar sensor 60 perform calculations to calculate (i) distances between the own vehicle and the standing objects, (ii) relative speeds between the own vehicle and the standing objects, and (iii) relative positions or orientations of the standing objects relative to the own vehicle, based on (i) differences in phase between the radiated millimeter waves and the received millimeter waves (i.e., the reflected waves), (ii) attenuation levels of the reflected waves, and (iii) amounts of time from radiating the millimeter waves to receiving the millimeter waves. The front radar sensor 60 provides information on results of the calculations as the standing object information to the driving assist ECU 10 with the predetermined cycle.

The driving assist ECU 10 synthesizes the standing object information provided from the front camera sensor 50 and the standing object information provided from the front radar sensor 60 to acquire the high-accuracy standing object information.

Hereinafter, the front camera sensor 50 and the front radar sensor 60 will be collectively referred to as "the front sensors", and information on situations ahead of the own vehicle acquired from the front camera sensor 50 and the front radar sensor 60 will be referred to as "the front sensor information."

The vehicle state sensors 70 include a vehicle moving speed sensor, a longitudinal acceleration sensor, a lateral acceleration sensor, and a yaw rate sensor. The vehicle moving speed sensor detects a moving speed of the own vehicle. The longitudinal acceleration sensor detects a longitudinal acceleration of the own vehicle. The lateral acceleration sensor detects a lateral acceleration of the own vehicle. The yaw rate sensor detects a yaw rate of the own vehicle.

The operation state sensors 80 include sensors or switches which detect operations which the driver perform (driving operations). The operation state sensors 80 include an acceleration pedal operation amount sensor, a brake pedal operation amount sensor, a brake switch, a steering angle sensor, a steering torque sensor, a blinker switch, and a shift position sensor. The acceleration pedal operation amount sensor detects an amount of pressing an acceleration pedal or an accelerator position. The brake operation amount sensor detects an amount of pressing a brake pedal. The brake switch detects an operation applied to the brake pedal. The steering angle sensor detects a steering angle. The steering torque sensor detects a steering torque. The blinker switch detects an activation state of blinkers. The shift position sensor detects a shift position of a transmission.

Information detected by the vehicle state sensors 70 and the operation state sensors 80 is provided to the driving assist ECU 10 via the CAN (not shown) with the predetermined cycle. Hereinafter, the information detected by the vehicle state sensors 70 and the operation state sensors 80 will be referred to as "the sensor information."

The buzzer 90 generates sounds in response to a buzzer drive signal output from the driving assist ECU 10. When the driving assist ECU 10 alerts the driver, the driving assist ECU 10 outputs the buzzer drive signal to the buzzer 90 to cause the buzzer 90 to generate the sounds. Thereby, the driver can be alerted.

The brake ECU 20 is electrically connected to brake actuators 21. The brake actuators 21 are provided in hydraulic circuits between a master cylinder (not shown) and friction brake mechanisms 22. The master cylinder compresses hydraulic oil by pressing force applied to the brake pedal. The friction brake mechanisms 22 are provided, corresponding to a left front wheel, a right front wheel, a left rear wheel, and a right rear wheel, respectively. Each of the friction brake mechanisms 22 includes a brake disc 22a and a brake caliper 22b. The brake disc 22a is secured to the respective wheel. The brake caliper 22b is secured to the body of the own vehicle. The brake actuators 21 adjust hydraulic pressure applied to wheel cylinders, depending on commands from the brake ECU 20. The wheel cylinders are provided in the respective brake calipers 22b. The brake actuators 21 activate the wheel cylinders with the adjusted hydraulic pressures to press brake pads to the respective brake discs 22a to generate friction braking forces.

The brake ECU 20 sets a driver-requested deceleration, based on the amount of pressing the brake pedal detected by the brake pedal operation amount sensor. The brake ECU 20 controls activations of the brake actuators 21 to decelerate the own vehicle at the driver-requested deceleration. In addition, the brake ECU 20 controls the activations of the brake actuators 21 to decelerate the own vehicle at a PCS-requested deceleration when the brake ECU 20 receives a PCS brake command sent from the driving assist ECU 10. The PCS-requested deceleration is information included in the PCS brake command.

The brake ECU 20 selects larger one of the driver-requested deceleration and the PCS-requested deceleration as the final requested deceleration when the brake pedal is operated while the brake ECU 20 receives the PCS brake command. The brake ECU 20 controls the activations of the brake actuators 21 to decelerate the own vehicle at the final requested deceleration. That is, the brake ECU 20 executes a brake override control.

The engine ECU 30 is electrically connected to engine actuators 31. The engine actuators 31 change operation states of an internal combustion engine 32. For example, the engine actuators 31 include a throttle actuator which changes an opening degree of a throttle valve. The engine ECU 30 controls activations of the engine actuators 31 to adjust torque generated by the internal combustion engine 32. The torque generated by the internal combustion engine 32 is transmitted to the driving wheels of the own vehicle via a driving mechanism as a driving force to the own vehicle. In this embodiment, the torque generated by the internal combustion engine 32 is equal to the driving force to the own vehicle.

The engine ECU 30 sets a driver-requested driving force (=driver-requested torque), based on the amount of pressing the acceleration pedal detected by the acceleration pedal operation amount sensor and the vehicle moving speed detected by the vehicle moving speed sensor. The amount of pressing the acceleration pedal may be referred to as "the acceleration pedal operation amount" or "the accelerator position." The engine ECU 30 controls the activations of the engine actuators 31 to cause the internal combustion engine 32 to output the driver-requested driving force. The engine ECU 30 refers to a map to acquire the driver-requested driving force. The map defines a relationship between the acceleration pedal operation amount and the driver-requested driving force, depending on the vehicle moving speeds. The driver-requested driving force is set to a larger value as the acceleration pedal operation amount is larger. In addition, the driver-requested driving force is set to a larger value as the vehicle moving speed is smaller.

When the engine ECU 30 receives an output limitation command sent from the driving assist ECU 10, the engine ECU 30 does not execute a driving force control, based on the driver-requested driving force as a target value. Instead, the engine ECU 30 controls the activations of the engine actuators 31 to control the driving force (the driving torque) generated by the internal combustion engine 32 to target driving force defined by target driving force information.

When the own vehicle is an electric vehicle, the engine actuators 31 are driving devices of electric motors. When the own vehicle is a hybrid vehicle, the engine actuators 31 are the above-mentioned engine actuators and the driving devices of the electric motors.

The meter ECU 40 is electrically connected to a display device 41 and stop lamps 42. The meter ECU 40 causes the display device 41 to display images relating to driving assists in accordance with commands from the driving assist ECU 10. In addition, the meter ECU 40 can turn on the stop lamps 42 in accordance with commands from the driving assist ECU 10 or the brake ECU 20.

PCS Control Section

Next, the PCS control to perform the autonomous braking will be described. The driving assist ECU 10 includes a collision determination section 11, an informing section 12, an autonomous braking section 13, a stopped state keeping section 14, a stopped state keeping termination section 15, a mistaken pressing determination section 16, and a driving force limitation section 17.

The collision determination section 11 determines whether the own vehicle collides with the standing object ahead of the own vehicle, based on (i) the front sensor information provided from the front sensors and (ii) vehicle states detected by the vehicle state sensors 70. For example, the collision determination section 11 performs a determination to determine whether the own vehicle collides with the standing object if present moving state of the standing object (or present stopped state of the standing object when the standing object is a stationary object) is maintained, and present moving state of the own vehicle is maintained. When the collision determination section 11 determines that the own vehicle collides with the standing object, the collision determination section 11 identifies the standing object as the obstacle, based on a result of the determination.

When the collision determination section 11 detects the obstacle, the collision determination section 11 calculates a predicted collision amount of time TTC. The predicted collision amount of time TTC is a predicted amount of time which the own vehicle takes to collide with the obstacle. The predicted collision amount of time TTC is calculated, based on a following equation (1), the distance d between the obstacle and the own vehicle, and the relative speed Vr of the own vehicle relative to the obstacle.

$$TTC = d/Vr \quad (1)$$

The predicted collision amount of time TTC is used as an index representing a level of potential that the own vehicle collides with the obstacle. The level of the potential or risk that the own vehicle collides with the obstacle, increases as the predicted collision amount of time TIC decreases.

According to the PCS control of this embodiment, there are two levels of the potential that the own vehicle collides with the obstacle, based on the predicted collision amount of time TIC. At an initial first level, the informing section 12 alerts the driver with using the buzzer 90 and the display device 41. At a second level having the larger level of the potential that the own vehicle collides with the obstacle than the first level, the autonomous braking section 13 executes a braking control (or an autonomous braking control) to perform a collision avoidance assist.

In this case, when the predicted collision amount of time TTC becomes equal to or shorter than a warning threshold TTCw, the collision determination section 11 determines that the level of the potential that the own vehicle collides with the obstacle, reaches the first level. Then, when the predicted collision amount of time TTC decreases further to become equal to or shorter than an activation threshold TTCa (<TTCw), the collision determination section 11 determines that the level of the potential that the own vehicle collides with the obstacle, reaches the second level. In this embodiment, when the level of the potential that the own vehicle collides with the obstacle, reaches the second level, a predetermined autonomous stopping condition is determined to become satisfied.

When the level of the potential that the own vehicle collides with the obstacle, is determined to reach the second level, the autonomous braking section 13 sends the PCS brake command to the brake ECU 20. The PCS brake command includes information on the PCS-requested deceleration Gpcs.

The PCS-requested deceleration Gpcs can be calculated as follows. Assuming that the obstacle stops, a moving distance X which the own vehicle moves until the own vehicle stops, can be expressed by a following equation (2). In the equation (2), a symbol "V" is the moving speed of the own vehicle (=the relative speed of the own vehicle), a symbol "a" is a deceleration of the own vehicle (<0), and a symbol "t" is an amount of time which the own vehicle takes until the own vehicle stops.

$$X = V*t + (½)*a*t^2 \quad (2)$$

The amount of time t which the own vehicle takes until the own vehicle stops, can be expressed by a following equation (3).

$$t = -V/a \quad (3)$$

When the equation (3) is assigned to the equation (2), the moving distance X which the own vehicle moves until the own vehicle stops, can be expressed by a following equation (4).

$$X = -V^2/2a \quad (4)$$

In order to stop the own vehicle by a distance β before the obstacle, the deceleration a should be calculated by setting the moving distance X to a distance (d−β) acquired by subtracting the distance β from the distance d detected by the front sensors. When the obstacle moves, the moving distance X is calculated, using the relative speed and the relative deceleration relative to the obstacle.

The deceleration a calculated as such is used as the PCS-requested deceleration Gpcs. There is an upper limit value Gmax for the PCS-requested deceleration Gpcs. Thus, when the calculated PCS-requested deceleration Gpcs exceeds the upper limit value Gmax, the PCS-requested deceleration Gpcs is set to the upper limit value Gmax.

When the brake ECU 20 receives the PCS brake command, the brake ECU 20 controls the activations of the brake actuators 21 to achieve the PCS-requested deceleration Gpcs. Thereby, the friction braking forces are generated on the left and right front wheels and the left and right rear wheels, and the own vehicle can be forcibly decelerated without a brake pedal operation by the driver.

As described above, the autonomous braking control is the control to generate the friction forces on the left and right front wheels and the left and right rear wheels in response to the PCS brake command and decelerate the own vehicle.

The autonomous braking section 13 determines whether the predicted collision amount of time TTC becomes larger than a termination threshold TTCb (TTC>TTCb) by the autonomous braking control. The termination threshold TTCb has been set to a value larger than the activation threshold TTCa. Therefore, the autonomous braking section 13 monitors whether the level of the potential that the own vehicle collides with the obstacle, decreases to a small level (i.e., whether the own vehicle has avoided a collision with the obstacle). When the autonomous braking section 13 determines that the level of the potential that the own vehicle collides with the obstacle, decreases to the small level, the autonomous braking section 13 terminates sending the PCS brake command. Thereby, an execution of the autonomous braking control is terminated, and an execution of the PCS control is terminated.

In addition, when the own vehicle is stopped by the autonomous braking control, the stopped state keeping section 14 in place of the autonomous braking section 13 controls the brake ECU 20. When the stopped state keeping section 14 confirms that the own vehicle is stopped by the autonomous braking control, the stopped state keeping section 14 sends a stopped state keeping command to the brake ECU 20 to keep the own vehicle stopped (i.e., prevent forward and rearward moving of the own vehicle). When the brake ECU 20 receives the stopped state keeping command, the brake ECU 20 controls the activations of the brake actuators to apply the hydraulic pressure set for keeping the own vehicle stopped to the wheel cylinders of the friction brake mechanisms 22 of the left and right front wheels and the left and right rear wheels. Thereby, the stopped state of the own vehicle is maintained. Hereinafter, keeping the own vehicle stopped will be referred to as "the stopped state keeping", and a braking force control to keep the own vehicle stopped will be referred to as "the stopped state keeping control."

The autonomous braking section 13 sends an output limitation command to the engine ECU 30 while the autonomous braking control is being executed. Similarly, the stopped state keeping section 14 sends the output limitation command to the engine ECU 30 while the stopped state keeping control is being executed. The output limitation command is a command to command the target driving force (for example, the target driving force corresponding to 0 percent accelerator position) so as not to affect the autonomous braking control and the stopped state keeping control. In addition, the brake ECU 20 sends a turning-on command of turning on the stop lamps 42 to the meter ECU 40 while the autonomous braking control or the stopped state keeping control is being executed.

The stopped state keeping termination section 15 determines whether a predetermined termination condition is satisfied. When the predetermined termination condition is satisfied, the stopped state keeping termination section 15 sends a stopped state keeping termination command to the brake ECU 20 and sends an output limitation termination command to the engine ECU 30. When the brake ECU 20 receives the stopped state keeping termination command, the brake ECU 20 terminates executing a control to control the activations of the brake actuators 21 for the stopped state keeping. Therefore, the stopped state keeping of keeping the own vehicle stopped, is terminated (i.e., an execution of the stopped state keeping control is terminated), and an execution of the PCS control is terminated.

Further, when the engine ECU 30 receives the output limitation termination command, the engine ECU 30 terminates performing an engine output limitation and executes an ordinary driving force control, that is, the driving force control to generate the driver-requested driving force, depending on the acceleration pedal operation amount and the vehicle moving speed. Thereby, a state of the own vehicle returns to an ordinary state, in which the own vehicle can accelerate and decelerate, depending on an acceleration pedal operation and a brake pedal operation.

When the stopped state keeping termination condition becomes satisfied, the output limitation command may be sent from the driving force limitation section 17 described later to the engine ECU 30. In this case, a target driving force defined by the output limitation command sent from the driving force limitation section 17, is used in place of the driver-requested driving force. Therefore, the engine ECU 30 controls the activations of the engine actuators 31 in accordance with the target driving force defined by the output limitation command sent from the driving force limitation section 17.

The stopped state keeping termination condition is a condition that a duration amount of time t for which the stopped state keeping control continues being executed, reaches a predetermined amount of time tref. The predetermined amount of time tref is, for example, two seconds.

In addition, the stopped state keeping termination section 15 sends a stopped state keeping termination signal to the driving force limitation section 17 when the stopped state keeping termination condition becomes satisfied.

Mistaken Pressing Operation

An operation that the driver mistakenly presses the acceleration pedal with an intention to press the brake pedal, is a mistaken pressing operation. An operation of rapidly pressing the acceleration pedal can be presumed to be the mistaken pressing operation. When the driver performs the mistaken pressing operation, the own vehicle rapidly approaches the obstacle, and the execution of the autonomous braking control may be started.

In this situation, the driver has potentially become panicked. Therefore, the driver may continue pressing the acceleration pedal strongly even when the own vehicle is stopped by the autonomous braking control. Thus, if the driver presses the acceleration pedal when the stopped state keeping is terminated, the own vehicle rapidly starts to move due to terminating performing the stopped state keeping. In this case, the own vehicle moves toward and close to the obstacle which the own vehicle has once avoided colliding with by the autonomous braking control.

Accordingly, the driving assist ECU 10 includes the mistaken pressing determination section 16 and the driving force limitation section 17 in order to solve such a problem.

The mistaken pressing determination section 16 has memorized a predetermined mistaken pressing determination condition. When the predetermined mistaken pressing determination condition becomes satisfied, the mistaken pressing determination section 16 determines or presumes that the driver's mistaken pressing operation occurs. The mistaken pressing determination section 16 sends a mistaken pressing determination result expressing whether the driver's mistaken pressing operation occurs, to the driving force limitation section 17. In addition, the mistaken pressing determination section 16 causes the buzzer 90 to generate the sound and sends a mistaken pressing detection signal to the meter ECU 40 while the mistaken pressing determination section 16 determines that the driver's mistaken pressing operation occurs. The meter ECU 40 causes the display device 41 to display an alerting display (for example, a display to inform that the acceleration pedal is pressed) while the meter ECU 40 receives the mistaken pressing detection signal.

When the stopped state keeping termination signal is sent to the driving force limitation section 17 from the stopped state keeping termination section 15, that is, when the stopped state keeping termination condition becomes satisfied, the driving force limitation section 17 reads the mistaken pressing determination result provided from the mistaken pressing determination section 16. When (i) the driver's mistaken pressing operation is determined to occur, and (ii) the acceleration pedal is still pressed strongly, the driving force limitation section 17 sends an output limitation command to the engine ECU 30 to limit the driving force generated by the internal combustion engine 32 to a driving force smaller than the driver-requested driving force, depending on the acceleration pedal operation amount.

Mistaken Pressing Determination Section

Next, processes which the mistaken pressing determination section 16 executes, will be described.

The stopped state keeping termination section 15 determines whether the mistaken pressing operation occurs, based on following mistaken pressing determination conditions E1 to E3.

E1: An elapsing amount of time elapsing since an acceleration pedal pressing rate determination becomes "ON", is shorter than or equal to a predetermined amount of time (e.g., 0.5 seconds). The acceleration pedal pressing rate determination will be described later.

E2: An autonomous braking activating determination flag F is "0."

E3: The acceleration pedal pressing amount AP is larger than or equal to a threshold APa (AP≥APa). The threshold APa is a value larger than a threshold APb described later.

When the mistaken pressing determination conditions E1 to E3 are satisfied (an AND condition is satisfied), the mistaken pressing determination section 16 determines that the mistaken pressing operation occurs. Hereinafter, a mistaken pressing determination result representing that the mistaken pressing operation is determined to occur, will be referred to as "Mistaken Pressing Determination: ON." in addition, the mistaken pressing determination result that the mistaken pressing operation is not determined to occur, will be referred to as "Mistaken Pressing Determination: OFF."

The acceleration pedal pressing rate determination of the mistaken pressing determination condition E1 is set to "ON" when following pressing rate determination conditions E1-1, E1-2, E1-3, and E1-4 are all satisfied (AND condition). On the other hand, the acceleration pedal pressing rate determination of the mistaken pressing determination condition E1 is set to "OFF" when any one of the pressing rate determination conditions E1-1, E1-2, E1-3, and E1-4 is not satisfied.

E1-1: The acceleration pedal pressing amount AP is larger than or equal to the threshold APb (AP≥APb).

E1-2: The acceleration pedal pressing rate APV is larger than or equal to a threshold APVc (APV≥APVc).

E1-3: An amount of time Tboff for which the brake switch continues to be in an OFF state, is longer than or equal to a threshold second Tx (Tboff≥Tx).

E1-4: An amount of time Twoff for which the blinkers continues being disactivated, is longer than or equal to a threshold second Ty (Twoff≥Ty).

The acceleration pedal pressing amount AP represents the amount of pressing of the acceleration pedal detected by the acceleration pedal operation amount sensor. The acceleration pedal pressing rate APV represents a change amount of the acceleration pedal pressing amount AP per unit amount of time.

The threshold APb is a threshold of the acceleration pedal pressing amount used for determining whether the mistaken pressing operation occurs. The threshold APVc is a threshold of the acceleration pedal pressing rate for determining whether the mistaken pressing operation occurs. These thresholds are set to values capable of detecting the operation of rapidly pressing the acceleration pedal. Therefore, using the pressing rate determination conditions E1-1 and E1-2 enables to detect the operation of rapidly pressing the acceleration pedal by the driver.

The pressing rate determination condition E1-3 is for setting a lower limit of the amount of time Tboff for which the brake pedal continues not to be operated from a point of time when the driver releases the brake pedal. For example, when the driver has not operated the brake pedal for a long time, the driver may not exactly distinguish between the acceleration pedal and the brake pedal. Therefore, when the amount of time elapsing from the point of time when the driver releases the brake pedal, is large, and the pressing rate determination conditions E1-1 and E1-2 are satisfied, the level of the potential that the mistaken pressing operation occurs, is high. For the reasons, the pressing rate determination condition E1-3 is provided.

The pressing rate determination condition E1-4 is for setting a lower limit of the elapsing amount of time Twoff for which the blinkers continue being disactivated. For example, immediately after the left blinkers or the right blinders change from an ON state (a blinking state) to an OFF state (a turned-off state), a potential that the own vehicle is overtaking a preceding vehicle or is moving on a curve, is high. In these situations, the driver intentionally and strongly operates the acceleration pedal. On the other hand, when a long time has elapsed from a point of time when the blinkers are disactivated, and the pressing rate determination conditions E1-1 and E1-2 are satisfied, the mistaken pressing operation is likely to occur. For the reasons, the pressing rate determination condition E1-4 is provided.

The mistaken pressing determination condition E2 is a condition that the autonomous braking control is not executed by the autonomous braking section 13. The autonomous braking section 13 outputs the autonomous braking activating determination flag F which is a signal representing whether the autonomous braking control is being executed. The autonomous braking activating determination flag F represents that the autonomous braking control is not executed by "0", and represents that the autonomous braking control is being executed by "1." The mistaken pressing determination section 16 reads the autonomous braking activating determination flag F and determines whether the mistaken pressing determination condition E2 is satisfied.

The mistaken pressing determination condition E3 is a condition for determining whether the acceleration pedal pressing amount AP further increases to become equal to or larger than the threshold APa within a predetermined amount of time after the acceleration pedal pressing rate determination becomes "ON." When the driver performs the mistaken pressing operation, the acceleration pedal pressing amount increases even after the acceleration pedal pressing rate APV becomes equal to or larger than the threshold APVc (i.e., after the pressing rate determination condition E1-2 becomes satisfied). This is because the driver may become panicked and strongly press the acceleration pedal. The mistaken pressing determination condition E3 uses the threshold APa set to a value larger than the threshold APb and determines whether the acceleration pedal pressing amount AP is equal to or larger than the threshold APa.

After the mistaken pressing determination section 16 determines that the mistaken pressing operation occurs, the mistaken pressing determination section 16 maintains this determination result until an acceleration pedal releasing operation performed by the driver is detected. For example, when the mistaken pressing determination section 16 detects that the acceleration pedal pressing amount AP becomes equal to or smaller than an acceleration pedal releasing determination threshold APend (for example, 10 percent accelerator position), the mistaken pressing determination section 16 returns the mistaken pressing determination result to "Mistaken Pressing Determination: OFF".

Mistaken Pressing Determination Routine

Figure 3:
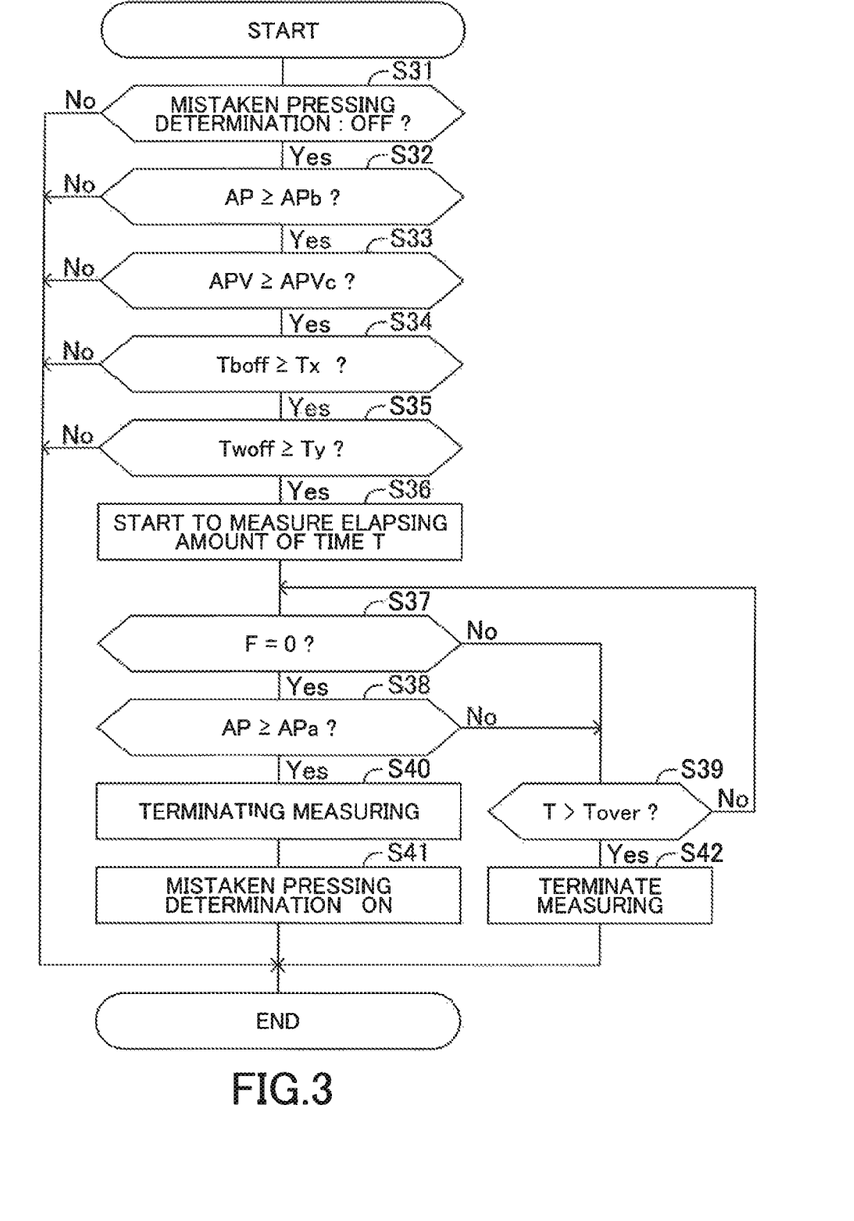
FIG. 3 is a view which shows a flowchart of a mistaken pressing determination routine.

FIG. 3 shows a mistaken pressing determination routine which concretely shows the processes which the mistaken pressing determination section 16 executes by a flowchart. The mistaken pressing determination section 16 executes the mistaken pressing determination routine with a predetermined calculation cycle.

At a step S31, the mistaken pressing determination section 16 determines whether the mistaken pressing determination result is "Mistaken Pressing Determination: OFF". When the mistaken pressing determination result is "Mistaken Pressing Determination: OFF", the mistaken pressing determination section 16 executes determination processes of a step S32 and steps following it. An initial value of the mistaken pressing determination result is "Mistaken Pressing Determination: OFF".

At the steps S32 to S35, the mistaken pressing determination section 16 determines whether the above-described pressing rate determination conditions E1-1, E1-2, E1-3, and E1-4 are satisfied. The process of the step S32 is a process to determine whether the pressing rate determination condition E1-1 is satisfied. The process of the step S33 is a process to determine whether the pressing rate determination condition E1-2 is satisfied. The process of the step S34 is a process to determine whether the pressing rate determination condition E1-3 is satisfied. The process of the step S35 is a process to determine whether the pressing rate determination condition E1-4 is satisfied.

When any one of the pressing rate determination conditions E1-1 to E1-4 of the steps S32 to S35 is not satisfied, the mistaken pressing determination section 16 terminates executing the mistaken pressing determination routine once. When the pressing rate determination conditions E1-1 to E1-4 are all satisfied while the mistaken pressing determination section 16 repeatedly executes the mistaken pressing determination routine with the predetermined calculation cycle, the mistaken pressing determination section 16 proceeds with the process to a step S36 to start to measure an elapsing amount of time T by a timer.

Next, at a step S37, the mistaken pressing determination section 16 determines whether the autonomous braking activating determination flag F is "0" (the mistaken pressing determination condition E2). When the autonomous braking activating determination flag F is "0", the mistaken pressing determination section 16 proceeds with the process to a step S38 to determine whether the acceleration pedal pressing amount AP is larger than or equal to the threshold APa (the mistaken pressing determination condition E3).

When a determination at the step S37 or the step S38 is "No", the mistaken pressing determination section 16 proceeds with the process to a step S39 to determine whether the elapsing amount of time T measured by the timer exceeds a predetermined amount of time Tover (for example, 0.5 seconds). When the elapsing amount of time T is smaller than or equal to the predetermined amount of time Tover, the mistaken pressing determination section 16 returns the process to the step S37 and repeatedly executes the above-described processes.

When the mistaken pressing determination conditions E2 and E3 are both satisfied (S37: Yes, S38: Yes) until the elapsing amount of time T reaches the predetermined amount of time Tover while the above-described processes are repeatedly executed, the mistaken pressing determination section 16 proceeds with the process to a step S40 to terminate measuring the elapsing amount of time T. The mistaken pressing determination section 16 proceeds with the process to a step S41 to set the mistaken pressing determination result to "Mistaken Pressing Determination: ON" and terminates executing the mistaken pressing determination routine.

On the other hand, when the elapsing amount of time T exceeds the predetermined amount of time Tover (S39: Yes) before the mistaken pressing determination condition E2 or E3 is satisfied, the mistaken pressing determination section 16 proceeds with the process to a step S42 to terminate measuring the elapsing amount of time T and terminates executing the mistaken pressing determination routine.

Mistaken Pressing Determination Cancellation Routine

Figure 4:
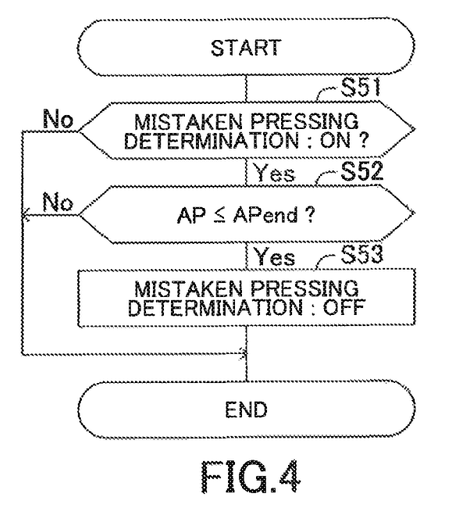
FIG. 4 is a view which shows a flowchart of a mistaken pressing determination cancellation routine.

The mistaken pressing determination section 16 executes a mistaken pressing determination cancellation routine shown in FIG. 4 to execute a process to return the mistaken pressing determination result to "Mistaken Pressing Determination: OFF" from "Mistaken Pressing Determination: ON". The mistaken pressing determination cancellation routine is executed with the predetermined calculation cycle in parallel with the mistaken pressing determination routine (FIG. 3).

When the mistaken pressing determination section 16 starts to execute the mistaken pressing determination cancellation routine, the mistaken pressing determination section 16 proceeds with the process to a step S51 to determine whether the mistaken pressing determination result is "Mistaken Pressing Determination: ON". When the mistaken pressing determination result is "Mistaken Pressing Determination: OFF", the mistaken pressing determination section 16 terminates executing the mistaken pressing determination cancellation routine once. When the mistaken pressing determination result is "Mistaken Pressing Determination: ON", the mistaken pressing determination section 16 proceeds with the process to a step S52 to determine whether a mistaken pressing determination termination condition is satisfied. In this case, the mistaken pressing determination section 16 determines whether the acceleration pedal pressing amount AP becomes smaller than or equal to the acceleration pedal releasing determination threshold APend (for example, 10 percent accelerator position). When the acceleration pedal pressing amount AP does not become smaller than or equal to the acceleration pedal releasing determination threshold APend, the mistaken pressing determination section 16 terminates executing the mistaken pressing determination cancellation routine once. When the acceleration pedal pressing amount AP becomes smaller than or equal to the acceleration pedal releasing determination threshold APend (S52: Yes) while the mistaken pressing determination section 16 repeatedly executes the above-described processes, the mistaken pressing determination section 16 proceeds with the process to a step S53 to set the mistaken pressing determination result to "Mistaken Pressing Determination: OFF" and terminates executing the mistaken pressing determination cancellation routine.

Driving Force Limitation Section

The driving force limitation section 17 reads the mistaken pressing determination result provided from the mistaken pressing determination section 16 when the stopped state keeping termination condition becomes satisfied. When the mistaken pressing determination result is "Mistaken Pressing Determination: ON", and the acceleration pedal pressing amount AP is larger than or equal to the threshold APa (AP≥APa), the driving force limitation section 17 sends the output limitation command to the engine ECU 30. The output limitation command is a command to limit the driving force generated by the internal combustion engine 32 to the driving force smaller than the driver-requested driving force. Hereinafter, a situation that (i) the mistaken pressing determination result is "Mistaken Pressing Determination: ON", and (ii) the acceleration pedal pressing amount AP is larger than or equal to the threshold APa when the stopped state keeping termination condition becomes satisfied, will be referred to as "a particular situation." In addition, the output limitation command which the driving force limitation section 17 sends to the engine ECU 30, will be referred to as "the particular situation output limitation command."

Figure 5:
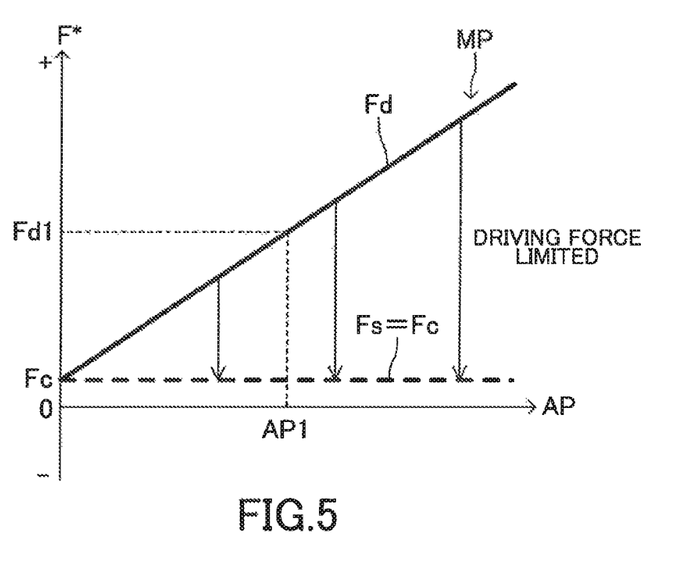
FIG. 5 is a view which shows a graph of a target driving force map (a driver-requested driving force and a particular situation target driving force).

In ordinary times, the engine ECU 30 calculates a target driving force F* to be generated by the internal combustion engine 32 with referring to a driver-requested driving force map. The driver-requested driving force map defines a relationship between the acceleration pedal operation amount AP (the accelerator position) and the driver-requested driving force Fd, depending on the vehicle moving speeds V. FIG. 5 shows an example of the driver-requested driving force map MP when the vehicle moving speed V is zero (V=0). A solid line denotes the driver-requested driving force map MP. For example, when the acceleration pedal operation amount AP is a value AP1, the driver-requested driving force Fd is set to a value Fd1.

For example, when the particular situation is detected, the driving force limitation section 17 sends the particular situation output limitation command defining the target driving force F* corresponding to 0 percent accelerator position to the engine ECU 30. In this case, as denoted by a dotted line in FIG. 5, the target driving force F* is set to a constant driving force Fc, independently of the acceleration pedal operation amount AP. The driving force Fc is the driving force for a creep moving.

When the engine ECU 30 receives the particular situation output limitation command, the engine ECU 30 controls the activations of the engine actuators 31 to cause the internal combustion engine 32 to generate the target driving force Fc. Hereinafter, the driving force control which is executed when the particular situation is detected and limits the target driving force F* to the driving force smaller than the ordinary driver-requested driving force Fd, will be referred to as "the driving force limitation control." In addition, the target driving force F* used in the driving force limitation control will be referred to as "the particular situation target driving force Fs."

Figure 6:
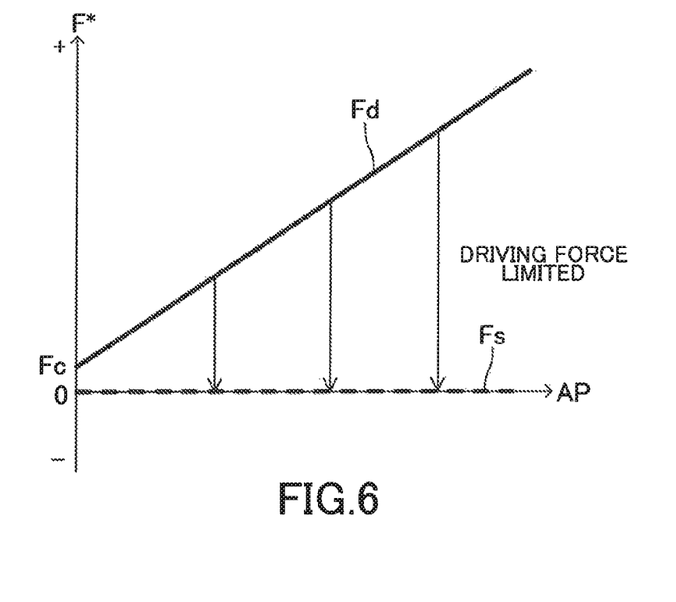
FIG. 6 is a view which shows a graph of a target driving force map (the driver-requested driving force and the particular situation target driving force).

The particular situation target driving force Fs may not be the driving force Fc for the creep moving. For example, as shown in FIG. 6, the particular situation target driving force Fs may be a constant value smaller than the driving force Fc for the creep moving, for example, may be zero. The particular situation target driving force Fs may be optionally set within a range smaller than or equal to the driver-requested driving force Fd. Similarly, when the vehicle moving speed varies, the particular situation target driving force Fs is limited to a value smaller than the ordinary driver-requested driving force Fd.

When a limitation control termination condition becomes satisfied, the driving force limitation section 17 terminates executing the driving force limitation control. The limitation control termination condition is satisfied when any one of following condition D1, D2, and D3 is satisfied (OR condition).

D1: The acceleration pedal operation amount AP is smaller than or equal to an acceleration pedal releasing determination threshold APend (AP≤APend).

D2: The operation of pressing the brake pedal is detected (the brake switch is ON), D3: The obstacle which has been detected, is not detected.

When the limitation control termination condition becomes satisfied, the driving force limitation section 17 sends an output limitation termination command to the engine ECU 30. When the engine ECU 30 receives the output limitation termination command, the engine ECU 30 terminates executing the driving force limitation control and executes the ordinary driving force control, that is, the driving force control to generate the driver-requested driving force, depending on the acceleration pedal operation amount and the vehicle moving speed. Thereby, the state of the own vehicle returns to the ordinary state, and the own vehicle can accelerate and decelerate in response to the acceleration pedal operation and the brake pedal operation.

PCS Control Routine

Figure 2:
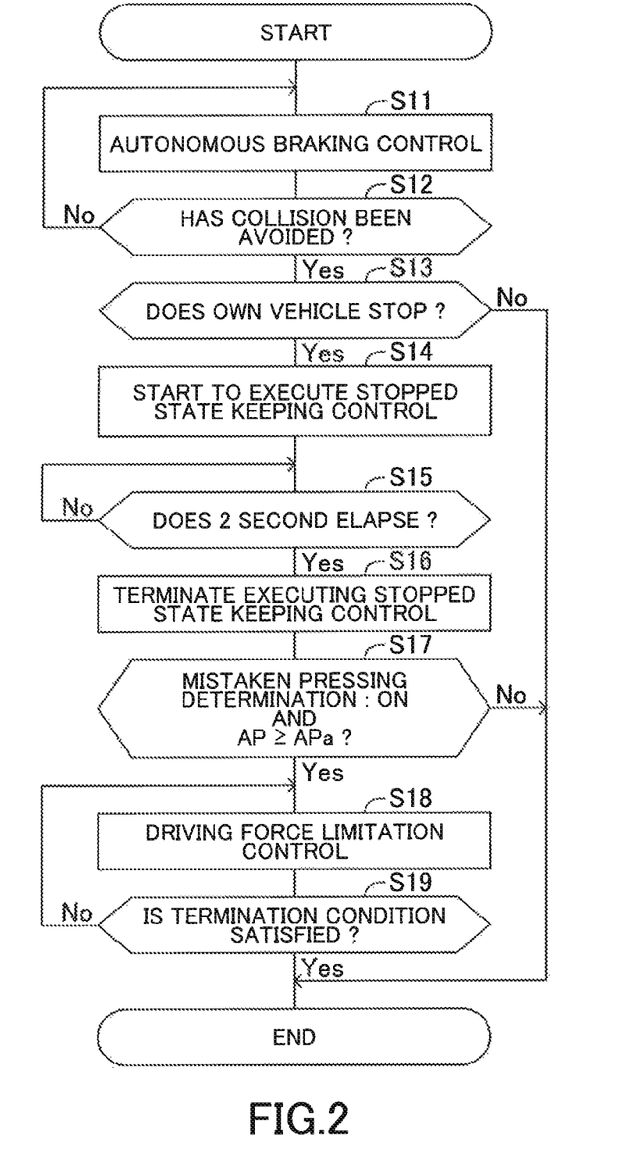
FIG. 2 is a view which shows a flowchart of a PCS control routine.

Next, PCS control processes which the above-described function sections of the driving assist ECU 10 execute, will be described. FIG. 2 shows a PCS control routine which the driving assist ECU 10 executes.

An execution of the PCS control routine is started when the level of the potential that the own vehicle collides with the obstacle, is determined to be high (that is, the predicted collision amount of time TTC becomes equal to or shorter than the activation threshold TTCa). While the PCS control routine is being executed, the mistaken pressing determination routine and the mistaken pressing determination cancellation routine are executed in parallel with the PCS control routine.

When the execution of the PCS control routine is started, the driving assist ECU 10 proceeds with the process to a step S11 to start to execute the autonomous braking control. Next, the driving assist ECU 10 proceeds with the process to a step S12 to determine whether a collision of the own vehicle with the obstacle has been avoided. In this case, the driving assist ECU 10 determines whether the predicted collision amount of time TTC becomes longer than the termination threshold TTCb (TTC>TTCb).

The driving assist ECU 10 continues executing the autonomous braking control until the driving assist ECU 10 determines that the collision of the own vehicle with the obstacle has been avoided. When the driving assist ECU 10 determines that the collision of the own vehicle with the obstacle has been avoided while the driving assist ECU 10 repeatedly executes the above-described processes, the driving assist ECU 10 proceeds with the process to a step S13 to determine whether the own vehicle stops. When (i) the predicted collision amount of time TTC becomes longer than the termination threshold TTCb, and (ii) the collision of the own vehicle with the obstacle has been avoided although the own vehicle does not stop, the driving assist ECU 10 terminates executing the PCS control routine.

On the other hand, when the own vehicle is stopped by the autonomous braking control (S13: Yes), the driving assist ECU 10 proceeds with the process to a step S14 to start to execute the stopped state keeping control. Thereby, the own vehicle is kept stopped. Next, the driving assist ECU 10 proceeds with the process to a step S15 to determine whether the stopped state keeping termination condition is satisfied. In this embodiment, the driving assist ECU 10 determines whether the duration amount of time t for which the stopped state keeping control continues being executed, reaches the predetermined amount of time tref (two seconds).

When the driving assist ECU 10 continues to execute the stopped state keeping control for the predetermined amount of time tref (S15: Yes), the driving assist ECU 10 proceeds with the process to a step S16 to terminate executing the stopped state keeping control. Next, the driving assist ECU 10 proceeds with the process to a step S17 to determine whether (i) the mistaken pressing determination result is "Mistaken Pressing Determination: ON", and (ii) the acceleration pedal pressing amount AP is larger than or equal to the threshold APa. The threshold APa is the same as the threshold used in the mistaken pressing determination condition E3. In this regard, the threshold APa is not limited to the threshold used in the mistaken pressing determination condition E3. The threshold APa may be any value capable of determining that the driver deeply presses the acceleration pedal.

A determination of the step S17 is a determination of whether the particular situation occurs now. When the particular situation does not occur, the own vehicle does not rapidly start to move even when the execution of the stopped state keeping control is terminated. To the contrary, when the particular situation occurs, the own vehicle rapidly starts to move if the execution of the stopped state keeping control is terminated. Accordingly, when the particular situation occurs (S17: Yes), the driving assist ECU 10 proceeds with the process to a step S18 to execute the driving force limitation control. Thereby, the target driving force F* is set to the particular situation target driving force Fs smaller than the driver-requested driving force Fd. Thus, the own vehicle does not rapidly start to move even when the execution of the stopped state keeping control is terminated.

On the other hand, when the particular situation does not occur (S17: No), the driving assist ECU 10 terminates executing the PCS control routine.

When the driving assist ECU 10 starts to execute the driving force limitation control, the driving assist ECU 10 proceeds with the process to a step S19 to determine whether the limitation control termination condition is satisfied. The limitation control termination condition is satisfied when any one of the above-described conditions D1, D2, and D3 is satisfied.

As long as the limitation control termination condition is not satisfied (S19: No), the driving assist ECU 10 continues executing the driving force limitation control. When the limitation control termination condition becomes satisfied, the driving assist ECU 10 terminates executing the PCS control routine.

According to the above-described driving assist apparatus according to the embodiment, when (i) the stopped state keeping termination condition becomes satisfied, (ii) the mistaken pressing determination result is "Mistaken Pressing Determination: ON", and (iii) the acceleration pedal pressing amount AP is larger than or equal to the threshold APa (AP≥APa), the driving force limitation control is executed. Therefore, even when (i) the driver deeply presses the acceleration pedal, and (ii) the stopped state keeping termination condition becomes satisfied, the target driving force F* is limited to the driving force Fs smaller than the driver-requested driving force Fd. Thereby, a rapid moving of the own vehicle can be prevented.

The driving assist apparatus has been described. The invention is not limited to the embodiment. Various modifications can be applied to the embodiment without departing from the object of the invention.

For example, the driving assist apparatus according to the embodiment executes the PCS control. In this regard, the invention is not limited to the driving assist apparatus which executes the PCS control. For example, the invention may be applied to the driving assist apparatus which executes the autonomous braking control when the driver will not presumably stop the own vehicle at a predetermined stop position (for example, the driver overlooks traffic signal) although regulations regulate that the own vehicle should be stopped, based on traffic infrastructure information (information indicated by the traffic signals and road signs) acquired by the front sensors. In this regard, the traffic infrastructure information is not limited to the information acquired by the front camera sensor 50. For example, the invention may be applied to the driving assist apparatus which acquires the traffic infrastructure information transmitted by wireless from roadside equipment via a vehicle-installed communication device.

Further, the driving assist apparatus according to the embodiment controls the activations of the brake actuators 21 to apply the hydraulic pressure set for the stopped state keeping to the wheel cylinders of the friction brake mechanisms 22 on the left and right front wheels and the left and right rear wheels when the driving assist apparatus keeps the own vehicle stopped. In this regard, for example, the invention may be applied to the driving assist apparatus which activates an electric parking brake (not shown) to keep the own vehicle stopped.

Further, the driving assist apparatus according to the embodiment uses the condition that (i) the mistaken pressing determination result is "Mistaken Pressing Determination ON", and (ii) the acceleration pedal pressing amount AP is larger than and equal to the threshold APa (AP≥APa) as a condition to execute the driving force limitation control. In this regard, the invention is not limited to such driving assist apparatus. The invention may be applied to the driving assist apparatus which uses at least a condition that the mistaken pressing determination result is "Mistaken Pressing Determination: ON".

What is claimed is:

1. A driving assist apparatus, comprising an electronic control unit configured to:
   execute an autonomous braking control to apply a braking force to an own vehicle to autonomously stop the own vehicle when the electronic control unit determines that a predetermined autonomous stop condition becomes satisfied;
   execute a stopped state keeping control to keep the own vehicle stopped after the electronic control unit stops the own vehicle by the autonomous braking control;
   terminate executing the stopped state keeping control when the electronic control unit determines that a predetermined stopped state keeping termination condition becomes satisfied while the electronic control unit executes the stopped state keeping control, the predetermined stopped state keeping termination condition being satisfied after the stopped state keeping control has been executed for a predetermined amount of time;
      determine whether a mistaken pressing operation occurs subsequent to executing the autonomous braking control and prior to terminating the stopped state keeping control, the mistaken pressing operation being an operation performed by a driver of the own vehicle to mistakenly press an acceleration pedal of the own vehicle with an intention to press a brake pedal of the own vehicle; and
      in response to determining that the mistaken pressing operation has occurred, when terminating the stopped state keeping control, the electronic control unit is further configured to limit a driving force generated to move the own vehicle subsequent to executing the autonomous braking control, wherein the driving force is limited to a value smaller than an initial driving force which was projected to be generated due to the mistaken pressing operation.

2. The driving assist apparatus as set forth in claim 1, wherein:
   the electronic control unit is further configured to execute the driving force limitation control when the electronic control unit determines that the predetermined stopped state keeping termination condition is satisfied, the mistaken pressing operation occurs, and the amount of pressing the acceleration pedal is larger than or equal to a predetermined threshold.

3. The driving assist apparatus as set forth in claim 1, wherein:
   the electronic control unit is further configured to terminate executing the driving force limitation control when the amount of operating the acceleration pedal becomes equal to or smaller than a predetermined termination threshold while the electronic control unit executes the driving force limitation control.

4. The driving assist apparatus as set forth in claim 1, wherein:
   the electronic control unit is further configured to terminate executing the driving force limitation control when the brake pedal is operated while the electronic control unit executes the driving force limitation control.

5. The driving assist apparatus as set forth in claim 1, wherein:
   the predetermined autonomous stop condition is a condition that a level of potential that the own vehicle collides with an obstacle, is larger than a predetermined level.

6. The driving assist apparatus as set forth in claim 5, wherein:
   the electronic control unit is further configured to terminate executing the driving force limitation control when the obstacle is not detected while the electronic control unit executes the driving force limitation control.

7. The driving assist apparatus as set forth in claim 1, wherein:
   the electronic control unit is further configured to determine that the mistaken pressing operation does not occur when an operation amount of the acceleration pedal becomes equal to or smaller than a predetermined determination threshold after the electronic control unit determines that the mistaken pressing operation occurs.

8. The driving assist apparatus as set forth in claim 1, wherein:
   the driving force is generated by one or more of an internal combustion engine and an electric motor.

* * * * *